United States Patent [19]

Crane et al.

[11] Patent Number: 4,866,756

[45] Date of Patent: Sep. 12, 1989

[54] INTERACTIVE COMPUTERIZED COMMUNICATIONS SYSTEMS WITH VOICE INPUT AND OUTPUT

[75] Inventors: Michael B. Crane; Neil W. Sullivan, both of Bettendorf, Iowa

[73] Assignee: Call It Co., Davenport, Iowa

[21] Appl. No.: 185,321

[22] Filed: Apr. 19, 1988

Related U.S. Application Data

[63] Continuation of Ser. No. 852,878, Apr. 16, 1986, abandoned.

[51] Int. Cl.⁴ .......................................... H04M 11/00
[52] U.S. Cl. ........................................ 379/88; 379/92
[58] Field of Search ................. 379/67, 69, 74, 77, 379/80, 81, 84, 88, 89, 91–93, 95, 97; 364/513.5; 381/51–53

[56] References Cited

U.S. PATENT DOCUMENTS

| Re. 31,188 | 3/1983 | Pirz et al. |
|---|---|---|
| 3,647,978 | 3/1972 | Hill |
| 3,747,228 | 7/1973 | Yamamoto ................ 379/80 X |
| 3,898,396 | 8/1975 | Gushue et al. |
| 3,928,722 | 12/1975 | Nakata et al. |
| 3,928,724 | 12/1975 | Byram et al. |
| 3,947,972 | 4/1976 | Freeman |
| 3,969,587 | 7/1976 | Calcagno |
| 4,016,540 | 4/1977 | Hyatt |
| 4,053,949 | 10/1977 | Recca et al. ................ 364/200 |
| 4,071,698 | 1/1978 | Barger, Jr. et al. ............ 379/84 |
| 4,078,316 | 3/1978 | Freeman ..................... 35/8 |
| 4,117,263 | 9/1978 | Yeh |
| 4,124,773 | 11/1978 | Elkins |
| 4,150,255 | 4/1979 | Theis et al. |
| 4,201,896 | 5/1980 | Bower et al. ................ 379/67 |
| 4,221,933 | 9/1980 | Cornell et al. |
| 4,241,238 | 12/1980 | Strand |
| 4,266,098 | 5/1981 | Novak |
| 4,272,810 | 6/1981 | Gates et al. ................. 364/900 |
| 4,277,649 | 7/1981 | Sheinbein |
| 4,280,192 | 7/1981 | Moll ........................... 364/900 |
| 4,320,256 | 3/1982 | Freeman ..................... 379/77 X |
| 4,327,251 | 4/1982 | Fomenko et al. |
| 4,340,783 | 7/1982 | Sugiyama et al. |
| 4,356,351 | 10/1982 | Shefler et al. |
| 4,357,493 | 11/1982 | Anderson et al. |
| 4,371,752 | 2/1983 | Matthews et al. |
| 4,389,546 | 6/1983 | Glisson et al. |
| 4,406,925 | 9/1983 | Jordan et al. |
| 4,410,763 | 10/1983 | Strawczynski et al. ....... 364/513 |
| 4,443,664 | 4/1984 | Gange |
| 4,454,586 | 6/1984 | Pirz et al. ................... 364/513 |
| 4,481,384 | 11/1984 | Matthews |
| 4,489,438 | 12/1984 | Hughes ....................... 381/51 |
| 4,500,753 | 2/1985 | Plunkett, Jr. |
| 4,514,593 | 4/1985 | Hattori et al. |
| 4,518,827 | 5/1985 | Sagara |
| 4,523,055 | 6/1985 | Hohl et al. |
| 4,539,435 | 9/1985 | Eckman ...................... 379/77 X |
| 4,539,436 | 9/1985 | Theis |
| 4,547,630 | 10/1985 | Giammarrusco ............. 179/89 |
| 4,549,047 | 10/1985 | Brian et al. |
| 4,594,476 | 6/1986 | Freeman |
| 4,598,367 | 7/1986 | DeFrancesco et al. ...... 381/51 X |
| 4,602,129 | 7/1986 | Matthews et al. ........... 379/84 X |
| 4,625,081 | 11/1986 | Lotito et al. ................ 379/88 |
| 4,645,873 | 2/1987 | Chomet ...................... 379/93 |
| 4,659,877 | 4/1987 | Dorsey et al. ............... 379/88 |
| 4,696,028 | 9/1987 | Morganstein et al. ....... 379/88 |
| 4,757,525 | 7/1988 | Matthews et al. ........... 379/89 |
| 4,783,800 | 11/1988 | Levine ........................ 379/67 |
| 4,785,408 | 11/1988 | Britton et al. .............. 364/513.5 |

OTHER PUBLICATIONS

Ozawa et al., "Voice Response System and Its Applications", *Hitachi Review*, vol. 28, No. 6, Dec. 1979, pp. 301–305.

Speech Plus, Inc., Mountain View, Calif., "Operating Manual Model T/VIS-X Telephone/Voice Interface System Preliminary User's Guide", May 30, 1983.

Primary Examiner—Keith E. George
Attorney, Agent, or Firm—Kenyon & Kenyon

[57] ABSTRACT

A computerized system (10) and method for collecting input information from a person connected by telephone (14) to the computerized system (10). The system (10) calls up predetermined audio information to establish a dialogue with the person. An operator (62) dynamically reviews the ongoing dialogues and can modify the set of audio information being used. The system (10) analyzes the correctness of the person's input information and can request correction of the information or disconnect the person if a predetermined weighted error count is also exceeded. The person's input information also provides important sales information such as the relationship between the number of sales and the degree of operator involvement with the dialogue, the time of day, week or season of the dialogue and the time required to complete the dialogue.

10 Claims, 3 Drawing Sheets

FIG. 4

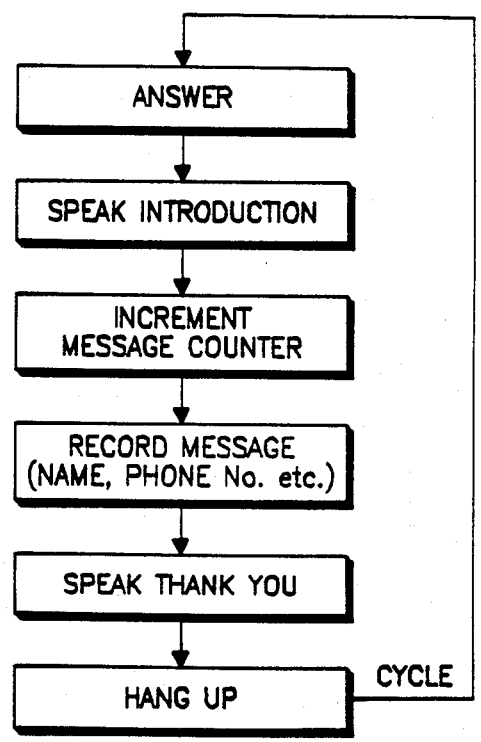

| STEP | FUNCTION | OPER 1 | OPER 2 | COMMENTS |
|------|----------|--------|--------|----------|
| 90 | STORE | 0 | *NUM | ZERO MESSAGE COUNTER |
| 100 | ANSWER | 1 | | ANSWER PHONE ON 1 RING |
| 110 | SPEAK | INTRO | | WELCOME AND REQUEST INFO |
| 120 | INCREMENT | *NUM | | INCREASE MESSAGE NUMBER BY 1 |
| 130 | ONSILENCE | 160 | | GOTO STEP 160 WHEN DONE |
| 140 | MAXTIME | 30 | | ALLOW 30 SECONDS |
| 150 | RECORD | MESSAGE *NUM | | STORE MESSAGE NUMBER *NUM |
| 160 | SPEAK | THANK YOU | | SAY THANK YOU AND BYE |
| 170 | HANG UP | | | DISCONNECT CALLER |
| 180 | GOTO | 90 | | RETURN TO WAIT FOR NEXT CALL |

FIG. 5

INTERACTIVE COMPUTERIZED COMMUNICATIONS SYSTEMS WITH VOICE INPUT AND OUTPUT

CROSS REFERENCE TO RELATED APPLICATION

This application is a continuation of U.S. Ser. No. 852,878, filed Apr. 16, 1986, now abandoned.

The present invention relates generally to an apparatus and method for collecting information from a person connected by telephone to the apparatus. More particularly, the invention relates to a computerized system for collecting input information from a person connected by telephone to the computerized system by carrying out a conversational dialogue with the person.

Previous systems for collecting information from a person connected by telephone to the system have been relatively unsophisticated in the manner of soliciting and collecting input information. The systems are generally inefficient in connecting the information and can even result in collecting useless and misleading information. Furthermore, in previous systems the dialogue between the person and the system has been quite stilted and unnatural due to a rigid script presented to the caller and also due to the inability to respond to circumstances which lie outside or deviate from the rigid script. In general such systems do not provide the person many options or degrees of freedom during the process of collecting information from the person. For example, the caller might commit errors in answering questions, have questions of particular interest or wish to provide information which cannot be accommodated by the computerized system.

BRIEF SUMMARY OF THE INVENTION

One of the primary objects of the invention is to provide an improved computerized communications system and method of operation thereof for collecting input information in a telephone dialogue with a person connected to the system.

A more particular object of the invention is to provide a novel computerized communications system enabling a person connected to the system various selectable methods of providing input information to the system.

Another object of the invention is to provide an improved computerized communications system capable of verifying selected information to a party connected thereto by telephone and also capable of analyzing erroneous inputs or the lack of an input and responding appropriately to the person.

An additional object of the invention is to provide a novel computerized communications system for collecting a variety of input information from a person connected to the system with the ability to associate and correlate the input information.

It is another object of the invention to provide an improved computerized communications system which has the ability to simultaneously collect input information from a plurality of different persons in a plurality of separate dialogues with the persons, selecting for use at least one of a plurality of respective associated sets of audio message signals.

A further object of the invention is to provide a novel apparatus for programming a computerized system to automatically collect information from a person connected to the system by telephone.

It is an additional object of the invention to provide an improved computerized communications system for collecting information from a person connected to the system and who can selectively verify, change and add input information.

In accordance with the invention an apparatus and method are provided for collecting input information in a telephone dialogue between a person and a connected computerized system. This system calls upon predetermined audio information, including computer software programs and prerecorded audio script, to carry out the telephone dialogue. The computerized system enables the collection of the input information, while allowing the person connected to the system various selectable optional ways of providing the input information to the system, such as by the person speaking directly to an operator, inputting input information to a storage means or by the person inputting data and encoded tones using a Touch Tone keypad on a telephone. The system efficiently collects a variety of information, such as marketing, sales and shipping information, which can all be associated and correlated among each type of information, as well as with the identity of the person providing the input information. Detailed statistical information is derivable from this body of input information. This input information is collected while still maintaining a smooth conversational flow to the telephonic dialogue by using carefully interspersed periods of collecting the input information and deactivating collection of the input information after detecting preselected periods of silence, wherein the sound level is below a predetermined sound threshold. The detected period of silence is typically followed by additional questions or comments output from the computerized system responsive to the silence or to receiving a specific response having significance to the computerized system. The computerized system further is able to selectively verify input information by asking the person to verify, correct or add to the input information. The accuracy and efficiency of the computerized syste is enhanced by analyzing and counting errors in input information, by a process of comparing with a set of predetermined caller error counts. The computerized system then is able to respond appropriately to the number and assigned weight of various types of errors. Appropriate responses include, for example, disconnecting a nuisance call, providing operator assistance to a calling person or requesting correction of selected input information. programming of the computerized system is reasily adapted and customized since computer programs are provided to enable construction in a predetermined manner of the complete program from user selected software to implement telephone dialogues for collecting the input information.

Further objects and advantages of the present invention, together with the organization and manner of operation thereof, will become apparent from the following detailed description of the invention when taken in conjunction with the accompanying drawings wherein like reference numerals designate like elements throughout the several views.

BRIEF DESCRIPTION OF THE DRAWINGS

FIG. 4 is a functional block diagram illustrating one operational mode of a computerized information collection system; and FIG. 5 shows the computer program implementation steps of FIG. 4.

DESCRIPTION OF PREFERRED EMBODIMENTS

Figure 1:
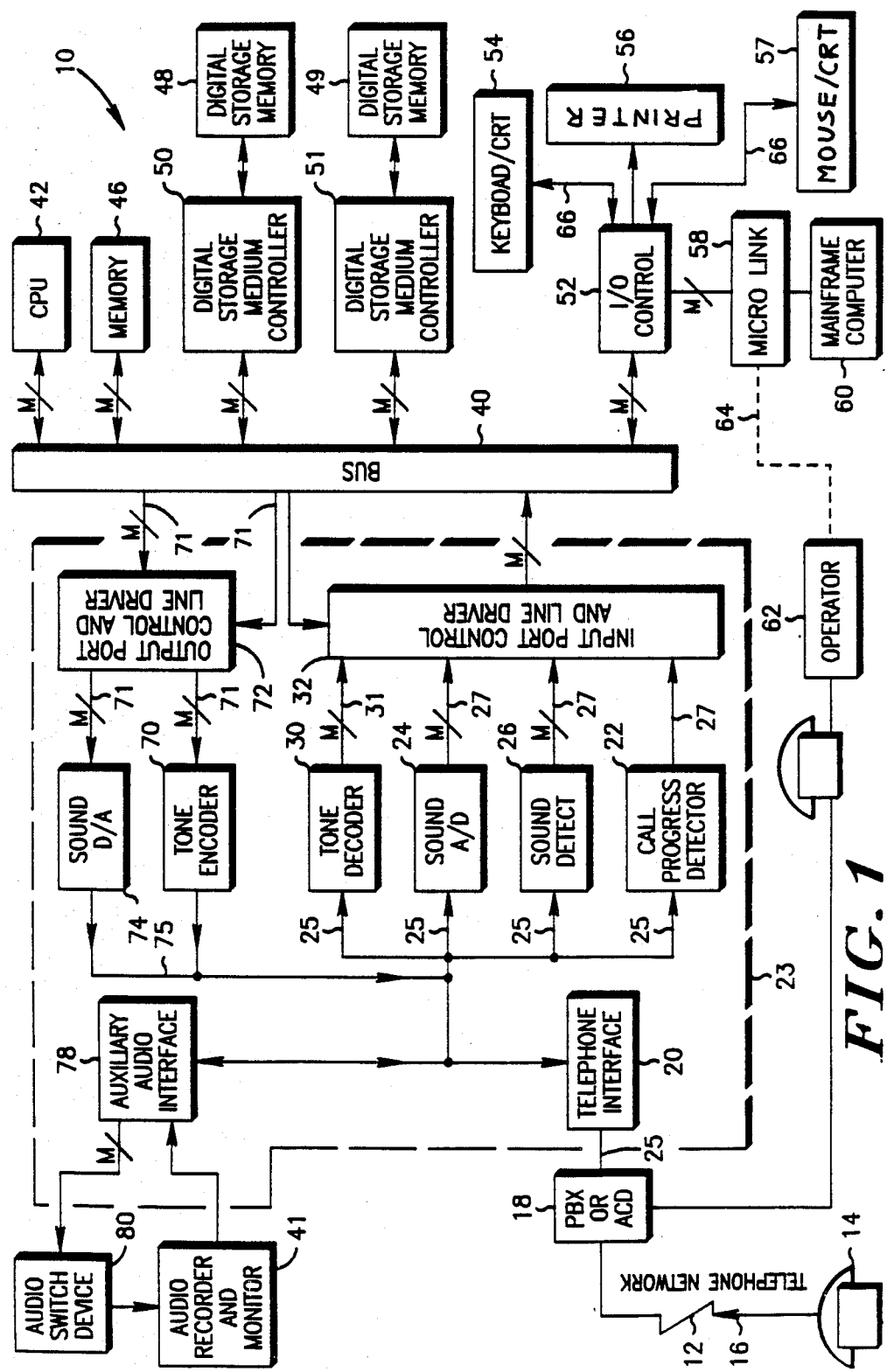
FIG. 1 is a block of hardware for one embodiment of a computerized information collection system.

Referring now to the drawings and in particular to FIG. 1, a block diagram of an automated telephone interrogative system, or a computerized information collection communications system, constructed in accordance with one embodiment of the invention is indicated generally at 10. The computerized information collection communications system 10 (hereinafter, the computer system 10) is responsive to a telephonically (or other communications devices coupling) connected person providing responses, such as an audio response 12, output from a telephone 14 (or other device for communicating with the computerized system 10) and carried over a telephone network 16 which includes a central office switching station. The audio response 12 is switched to the telephone number associated with the computerized system 10 by a local area switch 18, such as for example, a PBX or an automatic call distributor (see, for example, U.S. Pat. No. 4,320,256 which is incorporated by reference herein). The switch 18 provides an audio response signal 25 as the modified form of the audio response 12. The appropriately directed audio response signal 25 is input to an interface means, such as a telephone interface component 20 (for example, a Novation model 490278, Novation, Inc., and conforming to part number sixty-eight of the FCC Rules). The telephone interface component 20 is the initial component in a phone signal processing apparatus 23 to be discussed below (such as, for example, a CompuFone device, a product of Computalker Corp., Santa Monica, CA.). The telephone interface component 20 transmits the audio response signal 25 and acts as an analog bus to input the audio response signals 25 to an appropriate device.

The phone signal processing apparatus 23 includes various system components for operating on different types of inputs and outputs. In the case of inputs, for example, the audio response signal 25 is converted from analog to digital form by an analog to digital converter 24. The presence of sounds, such as the human voice or encoded tones, is sensed in the form of the audio response signal 25 by a sound detector 26. The level of sound sensed by the sound detector 26 will be useful in the telephonic dialogue between the computerized system 10 and the person, and this feature will be discussed in more detail hereinafter. The presence of an encoded tone for the audio response signal 25 is detected by a tone decoder 30 which converts the tone to digital form and will be useful in interpreting tone inputs by the person. A call progress detector 22 functions to detect ringing, busy, ring back signals and other signals generated by the telephone network 16.

If the audio response signal 25 is, for example, an encoded tone from a push button tone generating telephone, the encoded tone is input to the tone decoder 30 for conversion (as discussed above) to a decoded digitized form 31 and output to an input port controller and line driver 32 (for example, a component constructed per IEEE 696, or a Computalker S-100 Bus Product; Computalker Corp.). The input port controller and line driver 32 (hereinafter, the input controller/driver 32) manages the plurality of various inputs thereto, outputting signals to the appropriate location in the computerized system 10. The input controller/driver 32 is a single direction latch and address decoder which decodes the port address and allows the desired data to enter a bidirectional bus 40. The data is taken from the tone decoder 30 (or other selected device, such as the sound A/D converter 24, the sound detector 26 or the call progression detector 22) responsive to commands from a central processing unit 42 (discussed below) to the output ports of the controller/driver 32. The data is then output responsive to instructions from the central processing unit 42 to a device, such as a storage means. The interconnections between various components include a multiplicity of lines which are indicated by a slash and "M" in FIG. 1.

The collection of input information (by, for example, recording means, such as an audio recorder and controller unit 41 to be discussed hereinafter) from the response of the person and the output of questions and comments from the computerized system 10 are controlled by computer means, such as the central processing unit 42 (for example, an Alpha Micro AM-100L, manufactured by Alpha Micro Corporation, which incorporated a Motorola Corporation MC 68000 central processing unit). The central processing unit 42 communicates through the bus 40 to the remainder of the computerized system 10. The central processing unit 42 is coupled to various storage means, such as for example, a memory 46 (for example, a RAM and also selectively ROM, PROM, EPROM and PLA) and is preferably an Alpha Micro Corporation AM 720, with 512K byte RAM. Other possible storage means are optical storage discs and magnetic tape. Also coupled to the central processing unit 42 is a hard disc memory unit 48 (labelled DSM or digital storage memory in FIG. 1) having an associated digital storage medium controller (DSMC in FIG. 1) 50 (for example, an Alpha Micro Corporation, AM-435, 400M byte hard disc unit and controller). The central processing unit 42 can also be combined with memory, an arithmetic logic unit and other components; and the combination can be replaced by any one of a plurality of commercially available microcomputer units, such as a Mizar 10 or an IBM XT. An alternate storage system can be a video cassette recorder 49, VCR Panasonic PV1225A, and includes a video cassette controller 51, such as an Alpha Micro Corp., AM-610.

Access to the computerized system 10 to monitor, modify, edit or add to the input information, or to input or construct audio information for the actual programming of the computerized system 10 (to be described in a separate section) is accomplished through input/output controllers 52 (for example, an Alpha Micro Corporation AM-300, six port controller), coupled to various input/output means, such as, a keyboard/CRT terminal 54 (for example, an Alpha Micro AM 62A), a printer 56 (for example, an Alpha Micro AM 306) and a mouse/CRT combination 57.

Collection, analysis and editing of the input information, as well as the programming of the computerized system 10, can also be accomplished by units to (or outputs through) a mainframe interface link 58 (such as, for example, an IBM 3270PC microcomputer) to (form) a mainfrain computer 60. The input information collected from the person by the computerized system 10 can be transcribed by the operator 62 onto the interface link 58 directly to the mainframe computer 60 by the conversion into a digital form for analysis, and the input information can, for example, be used for placement of orders. The calls containing preliminary input information, such as telephone number and name, can also be screened by the operator 62 for call-back or verification by accessing the mainframe computer 60 through a connection 64. The mainframe computer 60 has extensive calculational powers, enabling some operations to be performed that would not be efficiently done or carried out rapidly enough on the central processing unit 42.

When the computerized system 10 has been connected with the person by, for example, answering a telephone call from the person, the dialogue typically begins with the computerized system 10 generating a prerecorded greeting to the person. The central processing unit 42 provides a sequence of digitized audio signals 71 responsive to predetermined audio information stored, for example, in the memory 46 and the hard disc memory unit 48. The sequence is predetermined to some degree, but depending on the complexity of branching possible in the computer program, there can be a large variety of paths taken by the dialogue in collecting the input information from the person. In particular the degree of branching is defined by the predetermined audio information and the programmed predetermined manner of operation (this process of programming the computerized system 10 will be described in detail hereinafter).

The predetermined audio information comprises computer software executable by the central processing unit 42 and prerecorded questions and comments digitized from a script, with selected portions to be presented in the dialogue with the calling person. The audio signals 71 are output from the central processing unit 42 to the bus 40 which transfers the audio signals 71 to an output port controller and a line driver 72 (hereinafter, the output controller/driver 72) which is a single direction latch identical in construction and function to the input controller/driver 32 described hereinbefore. The output controller/driver 72 outputs the audio signal 71 either to the tone encoder 70 (if the audio signal 71 is a digitized tone) or to an audio digital/analog converter 74 (if the audio signal 71 is a digitized voice output). Both the encoded DTMF output from the tone encoder 70 and the output from an audio digital/analog converter 74 comprise audio message signals 75. As described hereinbefore, the telephone interface component 20 transmits the audio message signal 75 from the computerized system 10 for final input to the telephone 14 to provide an audio output to the person.

Programming of the Computerized Voice Communications Systems

The following discussion sets forth specific examples of programming features and detailed explanation of these features are set forth in the "Digital Speech Announcer's Manual" attached as an Appendix to the file wrapper of this case.

The computerized system 10 is prepared for collection of input information from the person connected thereby by a user carrying out a programming operation in a predetermined manner. The user programs the computerized system 10 through a user means, such as the keyboard/CRT terminal 54 or the mouse/CRT combination 57. The user means provides an input signal 66 responsive to a user input. The user develops a desired form for the predetermined manner, such as through a script sequence. In order to complete the programming of the computerized system 10 in the predetermined manner, the user also stores commands from the user input 66 to call up various computer software programs.

The digitized forms of the user inputs 66 are thus stored in the hard disc storage unit 48 and incorporated as part of the computer program for implementing the dialogue between the person and the computerized system 10. The programming in the predetermined manner also include audio inputs (not shown) from the voice scripts mentioned above, comprising the questions and comments which are recorded by the audio recorder and controller unit 41 (for example, a Marantz PMD-220 audio cassette tape recorder, Marantz Corporation). The audio inputs are digitized by digitizing means, such as by appropriate computer software or by conventional A/D hardware converters, and stored in the hard disc storage unit 48. The prepared voice script includes the user selected universe of the audio inputs (which become the audio message signals 75) to be output from the computerized system 10 to the person during the telephonic dialogue. The assembled final program is therefore characteristic of the predetermined manner of operation and includes the incorporated user signals 66, the audio inputs and the various computer software programs. The assembled program is executed by the central processing unit 42 to perform the telephonic dialogue of collecting the desired input information from the person.

The predetermined manner of operation is executed with the assistance of an executive computer program which acts as a master control to guide the user through the necessry steps for establishing the dialogue, choosing among the alternative selectible courses of the dialogue and selecting from among the options for outputting questions and comments to the person, as well as the options presented to the person for collecting input information from the responses of the person. The user calls up the executive program which then sequences the user through the appropriate command requests to provide for various functionality as described in the specification and in the Computer Software Appendix of this specification. The executive program can be written in any one of a plurality of languages, including assembly language, BASIC, or in the preferred embodiment C-language, FORTRAN, and can operate under a plurality of commercially available operating systems, such as OS-9, CP/M-86, MS DOS, UNIX, or in the preferred embodiment the Alpha Micro operating system, AMOS Revision 1.2 A, and can be executed on any one of a plurality of commercially available computing systems, such as the Mizar 10 or IBM-XT.

Figure 2:
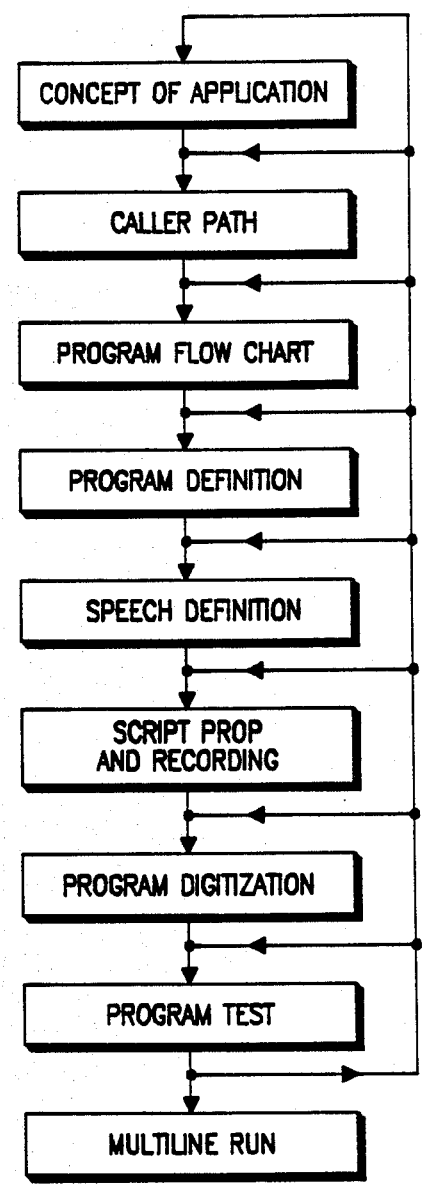
FIG. 2 is a functional block diagram of steps followed in the programming in a predetermined manner of a computerized information collection system.
Figure 3:
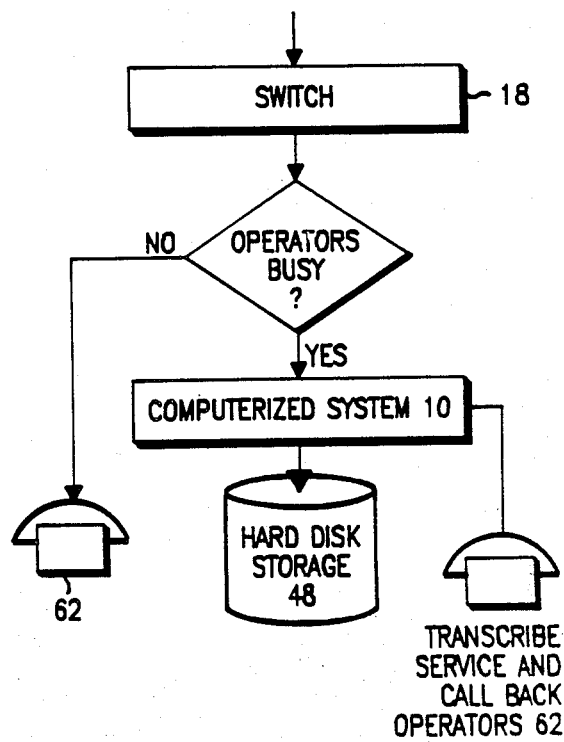
FIG. 3 is a functional block diagram of a mode of telephone call capture for a computerized information collection system.

In FIG. 2 is illustrated a functional block diagram showing the steps of programming the computerized system 10 in the previously explained predetermined manner. The user conceptualizes the application in terms of the desired objective, such as capturing direct response telephone calls from a plurality of persons. This objective can, for example, arise from insufficient agent capacity to capture a large volume of calls within a particular time period or a need to prescreen calls before calling back the person. In developing the program application it is important to prepare a general flow diagram for collecting the input information from the person in order to be certain to provide all the necessary functionalities. A simple example of a flow diagram is a call capture and call back application shown in FIG. 3. An incoming call from the person is input to the switch 18 which routes the call selectively to the operator 62 or to the computerized system 10 if all the operators 62 are occupied. In some forms of the invention the person, once connected to the computerized system 10, is given the option by the computerized system 10 to select either the operator 62 or the computerized system 10 to complete the call (this feature will also be discussed in more detail hereinafter). The calls routed directly to the operator 62 are processed in accordance with the level of interest of the person, whereas in the other branch all input information can be collected and stored in the hard disc memory 48 for subsequent screening.

In developing the program application it is further necessary to develop a detailed flow chart as set forth in one example in FIG. 4, wherein the computerized system 10 answers the telephone call, a prerecorded greeting is output, a message counter is incremented to denote the running count of messages being taken, information is recorded, such as name, address and phone number, a closing statement is output, such as "thank your"; and the computerized system 10 is disconnected from the telephone line of the person. A program definition step performs the structuring of the program in a step by step sequencing of commands with appropriate functionalities. When programming the computerized system 10, the executive program guides the user through this procedure, including asking the name of the program and revision number and asking which software program is to be called up, to be explained and to be incorporated in a user constructed program of the predetermined manner of operation.

Various examples of computer software programs routinely called upon in the programming operation (and when executing the final program in operation of the computerized system 10) are: "ANSWER" which answers a call on a specified ring; "ASSIGN" which associates and correlates various input information for one person; "DECREMENT" which decreases a specified variable by one; "DELETE which deletes a specific or single piece of digitized input information from a hard disc; "DIAL" which dials a specific phone number; "GOTO" which unconditionally transfers to a specific step number; "HANGUP" which disconnects the person from the computerized system 10; "IF" which conditionally transfers the person to a specified step number; "INCREMENT" which increases a specified variable by one; "MAXTIME" which assigns a maximum time in seconds allowed for a caller to provide a specific or single response to the computerized system 10; "ONHANGUP" which transfers to a specific step number upon detecting the disconnection of the person during the dialogue; "ONSILENCE" which transfers to a specific step number upon detection of a specified length of silence during the dialogue; "ON-TONE" which detects tone entry during the dialogue, interrupting the function and transferring to a specific step; "READD" which reads numeric data from a file into a variable; "RECORD" which digitizes the audio responses from a person and stores the digitized input information on a hard disc; "SPEAK" which outputs a specified digitized speech file; "SPEAKD" which outputs files selectively from a group of ten speech files; "STORE" which assigns the specified value of a numeric constant or variable to another variable; "TONECNT" which allows the entry of a particular number of DTMF tones from a calling person, to decoding these into their numeric value and storing the resulting digits in a variable location; "TONEMAX" which sets a maximum time limit for entry of the first one; "TRANSFER" which transfers the caller to a specified phone number and continues the program; and "WRITED" which saves numeric data from a variable into a file. Selected ones of these functions are shown in FIG. 5.

The step of speech definition in FIG. 2 defines speech files and data files identified in the program definition step. Speech files are files identified by by "DELETE," "SPEAK," "SPEAKD" and "RECORD" functions. Data files are filed identifed by the "READD" and "WRITED" function for storage of data received from tone responses from the person or other variables (such as, date and time).

In the step of script preparation and recordation the script content must be carefully assembled. The script is recorded either directly over a telephone input to the computerized system 10 or by the separate audio recorder and monitor 41 (such as the Marantz PMD-220, described hereinbefore) and then converted to the digitized response signal 27 in a conventional manner and stored in the hard disc storage unit 48. Once the digitized response signal 27 is in the hard disc storage unit 48, the central processing unit 42 can access the stored digitized response signal 27 and the quality and impression on the listener of the recorded script can be checked. Monitoring can be performed using the keyboard/CRT terminal 54 and a coupled audio output device, such as a telephone.

The next step in a programming operation is a program test run. When the user enters this phase, the executive program requests the program name and revision number the user wishes to execute. The program then requests the date and the channel number on which to accept a telephone call. As the program is run, the video display of the keyboard/CRT terminal 54 displays the current active step being executed and its associated function and operand, as well as associated speech file names.

In the final step of Run Multiline the computer software used to carry out the dialogue is put into a full operational mode with multiple phone lines and multiple program or dialogue definitions. This therefore allows the simultaneous collection of input information from a plurality of different persons through a dialogue between each of the persons and one of a plurality of respective associated sets of the audio message signals 75 output from the computerized system 10. Consequently, the central processing unit 42 responsive to the predetermined audio information stored in the hard disc storage unit 48 provides simultaneously a plurality of the audio message signals 75 with each set provided to the associated respective person. The sets of the audio message signals 75 can selectively be the same set, completely different sets and mixtures thereof provided to the plurality of different persons.

Information Collection Functionality

Operation of the computerized system 10 is carried out by the central processing unit 42 implementing a telephonic dialogue between the person connected to the computerized system 10. The central processing unit 42 is activated upon connection to the person, and the computerized system 10 provides a preselected sequence of the audio message signals 75 ultimately responsive to the predetermined audio information stored in the hard disc storage unit 48. The predetermined audio information preferably includes in part various computer software programs for performing selected functions in the dialogue between the person and the computerized system 10. In other forms of the invention the computer software programs can be replaced by dedicated hardware modules for carrying out the various functionalities. The computer software programs and the concepts contained therein are described hereinbelow for various exemplary functionalities, and source code for the various computer software programs is included as an Appendix to this specification.

A. Audio Information Input Options

The computerized system 10 includes audio means (such as, for example, the analog to digital audio converter 24, the digital to analog audio converter 74, the tone decoder 30 and the tone encoder 70 and the sound detector 26). In the mode of responding to the person, as described in the hardware discussion, selected components of the audio means operate to output selected ones of the audio message signals 75 from the computerized system 10 responsive to the audio signals 71. The central processing unit 42 provides these audio signals 71 responsive to the predetermined audio information stored in the hard disc storage unit 48. The audio message signals 75 include selectable options for ways in which the person can provide the input information to the computerized system 10. These input options presented to the person include, for example, speaking to an operator 62, speaking to the computerized system 10 resulting in storage of the response in digitizal form in the hard disc storage unit 48, and providing encoded data entries, such as by using tone generating pads of a push button form of the telephone 14.

B. Editing Options

In one aspect of the invention the person connected to the computerized system 10 is provided the ability to selectively verify, correct, edit and add further to the input information provided by the responses of the person. The central processing unit 42 responsive to the predetermined audio information provides in the audio message signals 75 to the person these various selectable options. The computerized system 10 can also selectively request verification of the input information, analyze the input information to determine the correctness thereof and inform the person through output of the audio message signals 75 of apparent errors in the input information or a need for additional information. In another aspect of the invention the user can edit the predetermined audio information to correct, add or further modify the audio information. This can, for example, be done by the user, or by the audio recorder and monitor 41 thru auxiliary audio interface 78. Computer software can be used to implement these functionalities and the relevant computer software programs are set forth in the Appendix maintained in the file wrapper of this case.

C. Statistical Associated Information

The computerized system 10 is useful for collecting a variety of input information, including, but not limited to, sales of goods or services from the responses of the person in the telephonic dialogue. During the dialogue the computerized system 10 generates a plurality of preselected questions and comments to collect the variety of input information. This input information can include coupled, associated marketing information, sales information and shipping information, The input information for the particular person is associated and coupled (such as by flag identification bits for each data entry associated with the person) to the person throughout various data files (or to some other chosen variable, such as location or time of day). Thus, cross correlation can be made to a marketing file concerned with the frequency of telephone calls and successful sales for various geographic regions and determined for different time periods (season, day and time of day).

Association and cross correlation can also be keyed to variables besides a person, such as geographic region or time. A sales file can be constructed in terms of sales statistics on the time required to complete a dialogue and the number of sales close in the automated mode without any operator intervention, as compared to partial or total operator involvement. Numerous variables can be studied and correlated to derive optimum sales benefits. Having available this type of extensive cross correlation ability enables substantial statisticalinformation to be developed from the responses of the persons. Using the mainframe computer 60, detailed sales and marketing models can be developed using the above discussed type of statistical information. Computer software to implement these various functionalities is set forth in the Appendix maintained in the file wrapper of this case.

D. Beginning and Ending of Input Information Collection

In order to be most efficient while remaining conversational during the collection of the input information in an automatic mode (at least for part of the time), the collecting means, such as an audio recorder and monitor 41 is selectively activated upon completing the preselected questions and comments. In some forms of the invention, activation of the collecting means can also require entry of a security code to gain access to the computerized system 10. The collecting means is deactivated upon achieving one or more predetermined conditions including, for example: (a) exceeding a preselected and user changeable silence time period while the sound level is below a predetermined audio threshold level, (b) the person inputting a specific number of user inputs or a particular user response (such as, for example, inputting ten tone entries for a phone number, no tone inputs being provided when some are expected and entering an improper security code to a system having access limited to appropriate parties) and (c) the person continuing to provide responses after a particular time period has elasped. Computer software to implement examples of some of these various functionalities is in the Appendix maintained in the file wrapper of this case.

E. Error Count

The significance and usefulness of the input information provided in the telephonic dialogue can be scrutinized, both during the dialogue and also after collecting the input information, by counting and categorizing errors made by the person. The hard disc storage unit 48, or other such storage device, can store predetermined error counts characteristic of the number and weight of various errors made in the responses of the person. The computerized system 10 can be operated either to count the errors and later evaluate the input information and/or to provide feedback in the audio message signals 75 presented to the person to enable correction of errors, branching to the operator 62 for assistance or terminating the call due either to the excessive number of errors or to the type of errors.

This functionality can also be coupled to the presence of unexpected periods of silence, such as no response at all or an insufficient duration of response to a question. The response expected can also be a DTMF input, a voice input or even a data input. Thus, for example, if no response is given after two requests for a name, phone number and address, the computerized system 10 could choose to disconnect from the person. Computer software to implement these functionalities is in the Appendix maintained in the file wrapper of this case.

While preferred embodiments of the present invention have been illustrated and described, it will be understood that changes and modifications can be made without departing from the invention in the broader aspects. Various features of the invention are set forth in the following claims.

What is claimed is:

1. A computerized communications system for collecting input information from responses including voice responses provided by a person through a telephonic dialogue between the person and said system, comprising:
    means for storing predetermined audio information, said audio information comprising digital data comprising questions and statements for carrying out said dialogue with the person;
    computer means coupled to said means for storing for providing a predetermined sequence of audio signals generated from said predetermined audio information supplied from said storing means;
    means for providing a telephonic connection between the person and said computer means, said means for providing a telephonic connection including means for coupling to a telephone network and for providing the person's responses to the computer means;
    means coupled to said computer means and to said means for providing a telephonic connection for providing an electronically modified form of the person's responses to said computer means;
    audio means coupled to the computer means and to said means for providing a telephonic connection for outputting audio message signals to the person responsive to said audio signals provided by said computer means, said computer means comprising means for determining if the person has provided a response and if the response is of sufficient duration and if not, for generating audio signals giving the person the option to selectively verify, correct, edit and add to said input information; and
    digital storage means coupled to said computer means for collecting the modified form of said input information from the person, said computer means providing selected portions of said input information stored in said collecting means to the person during the dialogue for allowing the person the opportunity to selectively verify, correct, edit and add to the input information.

2. A computerized communications system for collecting input information from responses including voice responses of a person through a telephonic dialogue between the person and said system, comprising:
    means for storing predetermined audio information, said audio information comprising digital data comprising questions and statements for carrying out said dialogue with the person;
    computer means coupled to said means for storing for providing a predetermined sequence of audio signals generated from said predetermined audio information supplied from said storing means, said computer means executing a predetermined program of operation to generate said predetermined sequence of audio signals;
    means for providing a telephonic connection between the person and said computer means;
    means coupled to the means for providing a telephonic connection and to the computer means for providing an electronically modified form of the responses of the person to said computer means;
    audio means coupled to said means for providing a telephonic connection and to said computer means for outputting audio message signals to the person responsive to said audio signals provided from said computer means;
    digital storage means coupled to said computer means for collecting said input information, said computer means comprising means for analyzing said input information to determine if the person has provided a response and if the response is of sufficient duration and if not, for providing a selected audio signal to said audio means to provide the person with an audio message signal to selectively request more of said input information to complete said dialogue, said computer means further providing selected portions of said input information stored in said digital storage means to the person during said dialogue to enable the person to determine the accuracy of the input information stored in said digital storage means.

3. The system as defined in claim 2 wherein said computer means responsive to said predetermined audio information provides the person the option of selectively verifying and changing said input information.

4. A computerized communications system for collecting input information from responses including voice responses input by a person in a telephonic dialogue between the person and said system, comprising:
    computer means;
    means for completing a telephonic connection between the person and said computer means;
    means for storing predetermined audio information in a digitized form, said information comprising questions and statements for carrying out the dialogue with the person, said storing means electrically coupled to said computer means;
    said computer means comprising means for providing a predetermined sequence of audio signals responsive to the input of said predetermined audio information from said storing means;
    audio means coupled to the computer means and to said means for completing a telephonic connection for outputting audio message signals to the person responsive to said sequence of audio signals from the computer means and said audio means further adapted for presenting the person, in response to the computer means, with selectable options in said audio message signals for providing said input information and for giving the person the option to selectively verify, correct, edit and add to the input information; and digital storage means coupled to the computer means for collecting said input information and associating the input information with (a) the degree of operator involvement in said dialogue, and (b) the time required to complete said dialogue;

said computer means providing selected portions of said input information stored in said collecting means to the person during the dialogue for allowing the person the opportunity to selectively verify, correct, edit and add to the input information;

said computer means including means for statistically analyzing the input information and for correlating the input information to a file related to the person.

5. The computerized communications system as defined in claim 4 wherein said input information comprises the number of sales closed.

6. A computerized communications system for collecting input information from responses including voice responses provided by a person through a telephonic dialogue between the person and the system, comprising:

means for storing predetermined audio information, the audio information comprising digital data comprising questions and statements for carrying out the dialogue with the person;

computer means coupled to the storing means for providing a predetermined sequence of audio signals generated from the predetermined audio information in the storing means;

means for providing a telephonic connection between the person and the computer means;

means coupled to the computer means and to the means for providing a telephonic connection for supplying an electronically modified form of the person's responses to the computer means, said means for supplying comprising analog to digital conversion means and means for receiving tone signals from the person's telephone;

audio means coupled to the computer means and to the means for providing a telephonic connection for providing audio message signals to the person generated from the audio signals from the computer means, said audio means including digital to analog conversion means;

digital storage means for storing the input information coupled to the analog to digital conversion means and to said computer means;

said computer means including means for analyzing the input information from the person and for determining if a response exceeds a set maximum time limit or a period of silence in the response exceeds a preset minimum time limit said computer means further comprising means for evaluating the input information to determine if the person has provided a response and if the response is of sufficient duration and if not, for providing a selected audio signal to the audio means to provide the person with an audio message signal to selectively request more of said input information to complete the dialogue, said computer means further providing selected portions of said input information stored in said digital storage means to the person during the dialogue to enable the person to determine the accuracy of the input information stored in the digital storage means.

7. The computerized communications system recited in claim 6 wherein said computer means comprises means for generating audio signals giving the person the option to selectively verify, correct, edit and add to the input information during the dialogue.

8. A method for collecting input information from responses including voice responses provided by a person through a telephonic dialogue between the person and a computerized communication system comprising the steps of:

storing predetermined audio information in a digital memory, said audio information comprising questions and statements for carrying out said dialogue with the person;

providing with computer means a predetermined sequence of audio signals generated from said predetermined audio information;

providing a telephonic connection between the person and the computer means and providing an electronically modified form of the person's responses to the statements and questions to the computer means;

determining if the person has provided a response and if the response is of sufficient duration and if not, outputting selected audio message signals to the person responsive to the audio signals provided by the computer means, said step of outputting further including generating audio signals giving the person an option to selectively verify, correct, edit and add to the input information; and collecting the modified form of the input information in digital storage means from the person, and providing selected portions of the input information stored in the digital storage means to the person for giving the person the option to selectively verify, correct, edit and add to the input information.

9. A method for collecting input information from responses including voice responses of a person through a telephonic dialogue between the person and a computerized communication system comprising the steps of:

storing predetermined audio information, the audio information comprising digital data comprising questions and statements for carrying out the dialogue with the person;

providing with computer means a predetermined sequence of audio signals generated from the predetermined audio information the computer means executing a predetermined program of operation to generate the predetermined sequence of audio signals;

providing a telephonic connection between the person and the computer means;

providing an electronically modified form of the responses of the person to the computer means;

outputting audio message signals to the person responsive to the audio signals provided from the computer means;

collecting the input information and analyzing the input information to determine if the person has provided a response and if the response is of sufficient duration and if not, providing a selected audio signal to provide the person with an audio message signal to selectively request more of the input information to complete the dialogue, and further comprising the step of providing selected portions of the input information to the person during the dialogue to enable the person to determine the accuracy of the input information.

10. A method for collecting input information from responses including voice responses input by a person in a telephonic dialogue between the person and a computerized communication system comprising the steps of:

completing a telephonic connection between the person and the system;

storing predetermined audio information in a digitized form, the audio information comprising questions and statements for carrying out the dialogue with the person;

providing a predetermined sequence of audio signals responsive to the predetermined audio information;

outputting audio message signals to the person responsive to the sequence of audio signals from the computer means and presenting the person with selectable options in the audio message signals for providing the input information to the system and for giving the person the option to selectively verify, correct, edit and add to the input information;

collecting the input information and associating the input information with (a) the degree of operator involvement in the dialogue, and (b) the time required to complete the dialogue;

providing selected portions of said input information to the person during the dialogue for allowing the person the opportunity to selectively verify, correct, edit and add to the input information; and statistically analyizing the input information and correlating the input information to a file related to the person.

* * * * *